US006772016B1

(12) United States Patent
Örn

(10) Patent No.: US 6,772,016 B1
(45) Date of Patent: Aug. 3, 2004

(54) APPARATUS AND A METHOD FOR CONTROLLING FUNCTIONS IN AN ENVIRONMENT

(76) Inventor: Bertil Örn, Frösögen 47, Frösön SE-832 44 (SE)

(*) Notice: Subject to any disclaimer, the term of this patent is extended or adjusted under 35 U.S.C. 154(b) by 0 days.

(21) Appl. No.: 09/979,290

(22) PCT Filed: May 5, 2000

(86) PCT No.: PCT/SE00/00891

§ 371 (c)(1),
(2), (4) Date: Nov. 19, 2001

(87) PCT Pub. No.: WO00/73966

PCT Pub. Date: Dec. 7, 2000

(30) Foreign Application Priority Data

May 18, 1999  (SE) .............................................. 9901789

(51) Int. Cl.[7] .............................................. G08B 23/00
(52) U.S. Cl. ...................................... 700/9; 340/825.19
(58) Field of Search .......................... 700/9, 108, 109, 700/245, 247, 250, 275; 704/271; 340/825.19

(56) References Cited

U.S. PATENT DOCUMENTS

| | | | |
|---|---|---|---|
| 4,497,031 A | | 1/1985 | Froehling et al. ........... 364/505 |
| 4,875,185 A | * | 10/1989 | Bornschein ................. 364/900 |
| 5,530,703 A | * | 6/1996 | Liu et al. .................. 370/85.13 |
| 5,689,229 A | * | 11/1997 | Chaco et al. ........... 340/286.07 |
| 6,195,004 B1 | * | 2/2001 | Leonowich ................. 340/539 |
| 6,230,137 B1 | * | 5/2001 | Has et al. ................... 704/275 |
| 6,348,867 B1 | * | 2/2002 | Myllymaki ............... 340/573.1 |
| 6,377,925 B1 | * | 4/2002 | Greene, Jr. et al. ......... 704/271 |
| 2002/0121964 A1 | * | 9/2002 | Sano et al. ............. 340/310.01 |

FOREIGN PATENT DOCUMENTS

DE  WO 98/55992  * 12/1998  ............. G10L/3/00

OTHER PUBLICATIONS

The American Heritage Dictionary of the English Language, Copyright 2000, Houghton Mufflin Company, 4th edition.*
The Authoritative Dictionary of IEEE Standards Terms 2000, 7th edition, Standards Information Network IEEE Press, p. 98.*
The Microsoft Computer Dictionary 1999, 4th edition, Microsoft Press, pp. 339 and 403.*
Furugren et al., "SmartBo—ett fungerande hem för funktionshindrade", Avdelningen för kommunikationshandikapp, Hjälpmedelsinstitutet, Jan. 26, 1999.

* cited by examiner

Primary Examiner—Leo Picard
Assistant Examiner—Sean Shechtman
(74) Attorney, Agent, or Firm—Dilworth & Barrese LLP.

(57) ABSTRACT

An apparatus for controlling functions at output units in an environment depending on events and/or conditions within or associate with the environment. The apparatus has a combination of input units to register events and/or conditions of the environment and deliver information of such events and/or conditions, an input-output unit arranged to receive the information from the input units and control commands to the output units, and forward this information without any influence on the information in either direction, and a computer unit arranged to make decisions.

21 Claims, 2 Drawing Sheets

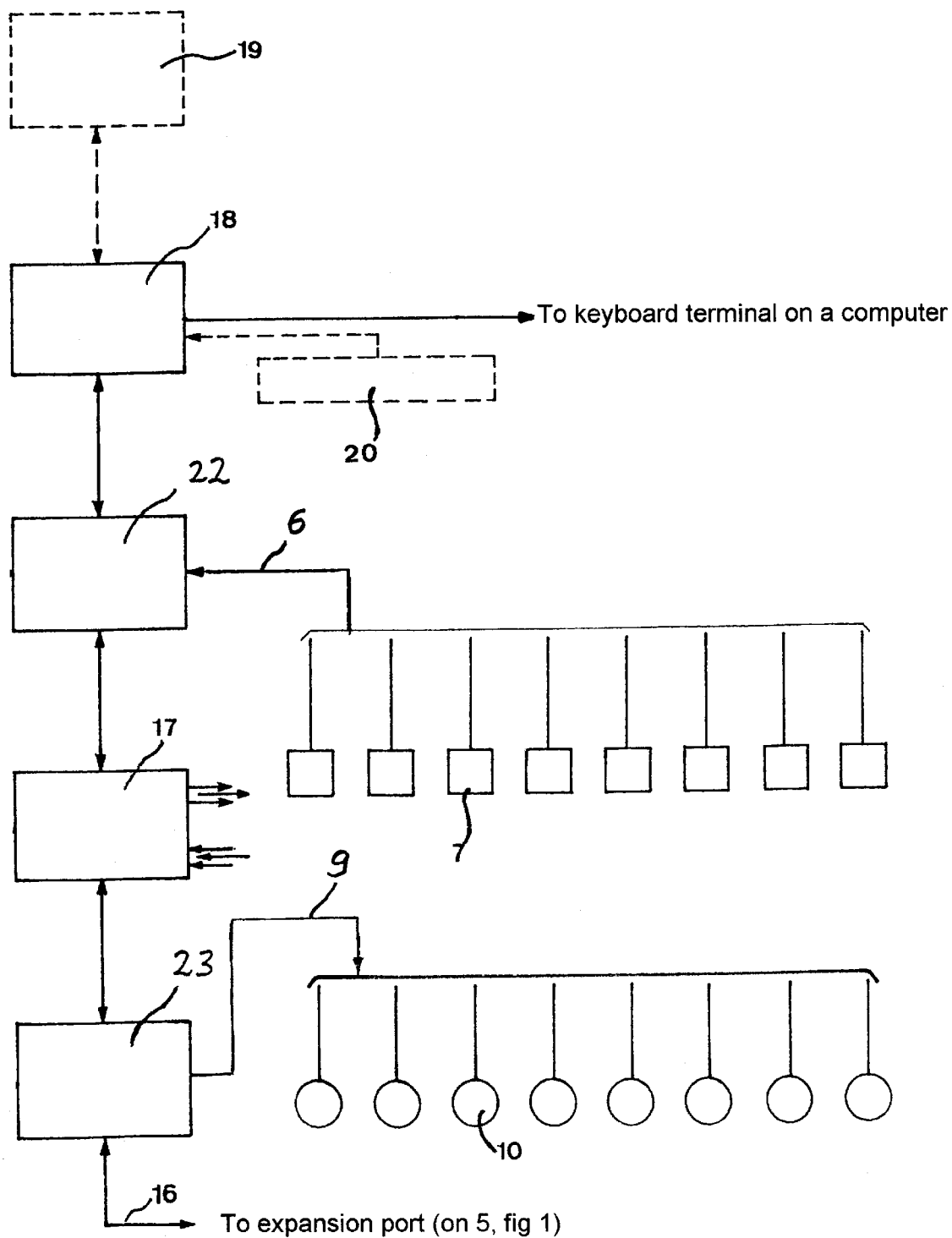

APPARATUS AND A METHOD FOR CONTROLLING FUNCTIONS IN AN ENVIRONMENT

FIELD OF THE INVENTION AND PRIOR ART

The present invention relates to an apparatus for controlling functions for first devices in an environment depending on events and/or conditions within, or associated with, the environment, an a respective method.

As used herein the term "environment" can generally be any area, which may or may not be physically well-defined, such as, e.g., a home, a place of work or a well-defined outdoor area. However, the invention is in particular directed to an environment in which persons having some kind of problem in managing on their own are present, such as persons with developmental disability or dementia in an environment in the form of a home or a place of work, and therefore, the problem addressed and to be solved by the present invention will hereinafter be described in relation to this specific application of the present invention for the purpose of illustration only and, thus, not limitation by any means.

Persons with developmental disability or dementia are in need of help in order to manage in their homes and at the place of work, and in that respect it is desirable that they can be given an as good as possible support during the time they will have to manage on their own. Thereby, their self-esteem and quality of life can be enhanced. In order to achieve the above object apparatus of the above-mentioned type have been arranged in, e.g., homes for persons with developmental disability, but the function, however, of these apparatus leaves a great deal to be desired. It has only been possible to use a fixed controlling of these apparatus, i.e., the apparatus does exactly what it is constructed to do, often without being able to adapt its performance to the current situation in any given moment and to any recently occurred events. Such an adaptation with fixed controlling might be suitable for persons having a normal intellect, but not for persons with developmental disability or dementia, since it lacks the ability to give an intellectual support. These apparatus accordingly exhibit several independent so called smart partial solutions, but these only adapt to each other to a certain degree or not at all. For example, different types of said first devices, such as a doorlock, a doorbell or any other device reminding of something to be done, can operate totally independent of each other, i.e., without adapting to the functions of each other, to anything previously happened, and thus, to the current situation at the particular moment;

SUMMARY OF THE INVENTION

The object of the present invention is to provide an apparatus of the initially defined type, which to a great extent obviates the above discussed drawbacks of the previously known apparatus.

According to the invention, this object is achieved by providing such an apparatus with the combination of:

1. second devices adapted to register events and/or conditions of the environment and to deliver information thereof,
2. an input/output unit adapted to receive said information from the second, so called input devices, and control commands for the first, so called output devices, and, without any information distorting processing, send this information and control commands, respectively, further on,
3. a computer unit, the input/output unit being connected to a port of the computer unit and adapted to send said information to the same, the computer unit being adapted to, on the basis of this information and information stored in memory devices contained therein, prepare said control commands and send these to the input/output unit which is adapted to send them forward to output devices pertaining to these control commands for controlling the functions of said devices, such that the computer unit is adapted to solely make all the decisions.

Thus, in this apparatus all parts will co-operate into one single smart entirety instead of the different independent smart partial solutions of the prior art apparatus, so that the apparatus in every moment in detail can adapt its performance, i.e., the controlling of the functions of the first devices, to the current situation and to anything recently happened. Such an apparatus can thus be used to give persons with developmental disability or dementia an active intellectual support. Accordingly, this is accomplished by using an input/output unit sending signals between the input devices and the computer unit, and between the computer unit and the output devices without any information distorting processing thereof, and by the fact that all logical processing is performed in the computer unit, i.e., it is this unit solely making all the decisions, and it can do this by having access to all information that might be required in order to make a proper decision adapted to every specific situation, by virtue of the fact that information from the input devices is received unprocessed by the computer, and other important information for the decision to be made is stored in the memory device thereof. In an apparatus according to the invention, in the case of use thereof in a home for a person with developmental disability, it will thereby be possible to connect with each other the information from a doorbell, the fact that "Aunt Johanna" has gone out, and telephoning, in which case the person can be informed that there is no use calling her now.

According to a preferred embodiment of the invention, the memory devices are adapted to store information obtained from said second, so called input devices, on the environment and events taking place therein for use in subsequent preparing of control commands to said first devices on the basis of information obtained from the second devices at that point of time, and information stored in the memory device. By virtue of the fact that in this manner the device, the computer unit, wherein all decisions are made and control commands prepared, is informed of events which have occurred in the environment in the past, and information on the environment, as well as on any event occurring at the give point of time, decisions perfectly adapted to the given situation can be made, and the corresponding control commands be prepared, so that the apparatus always reacts in a desired way on a certain event or a certain condition depending upon the current situation, instead of always reacting in the same way on a certain event, without taking into account any other circumstances, such as the prior art apparatus do.

According to another preferred embodiment of the invention the memory device is adapted to store information about the characteristics and/or desires of a person using the apparatus. This will enable to adapt the control commands prepared by the computer unit to the developments of the user, i.e., the needs and the ability of the user at the particular point of time, such that the apparatus will take into account the fact that the person gradually learns. This information can then be entered into the computer unit by of changing the software thereof, the computer unit preferably being a programmable personal computer. An apparatus of this type will generally have to be able to communicate with its user by means of text, speech, sound, picture or color, and this can normally be done by a personal computer, which thereby will be superior to a so called industrial control system. Moreover, it is easy to communicate to, versatile, easy to program, and easy to send data to. Additionally, the personal computer has a large memory capacity and personal computers are programmed in a similar fashion independently of the make and type thereof.

According to another preferred embodiment of the invention, the computer unit is adapted to prepare said control commands on the basis of, and by of the memory device having access to, all information available within the apparatus, which information the form of said control commands might be dependent upon for the adapting of said control commands to the current situation in the environment. Due to the fact that all the information based on which a decision is to be taken in this manner is updated and is gathered in one single place, and that all decisions are made there, it is possible to make logically intelligent decisions regarding the performance of the apparatus, and adapted to the overall situation. Thereby, in every moment, the apparatus as an entirely is able to perform in an intelligent way.

According to another preferred embodiment of the invention the computer unit is adapted to become activated, as to the preparation of said control commands, by changes of status or other events in the environment, reported from said input devices via the input/output unit. As used herein, the term "events" is used in a broad sense and comprises as used in the description and in the claims also such things such as the fact that a certain point of time has been reached, the weather changes (according to a previously given forecast), and the like. By letting the computer unit be activated by such changes of status or other events in the environment it will automatically function as an intellectual support for the person with a developmental disability, so that the measures and support all the time can be adapted to the current situation.

According to yet another preferred embodiment of the invention the computer unit comprises an editor adapted to prepare said control commands and to give these a form which is independent of the type of computer unit, i.e., to make the control commands machine independent. This is important for the reuse of programs. Accordingly, the code of the control program itself will be exactly the same independently of in which computer the editing has been done, and of which computer is being used in the plant for which the program has been made.

According to another preferred embodiment of the present invention the input/output unit is adapted to communicate with the computer unit through any of the ports thereof. In that regard it is advantageous to connect the input/output unit to the serial port of the computer unit, since this at present is the only standardised port exhibited by all types of computers. By using the serial port for the communication between the computer and the input/output unit one will thus be independent of the type of computer. This way of communication also means that no modifications have to be done on the computer unit for said communication.

According to other preferred embodiments of the invention the input/output unit can be devoid of any means for logical signal processing, i.e., be especially designed for computer based adaptations for the disabled, or the input/output unit exhibits means for logical signal processing adapted not to perform any information distorting processing of signals in to and out from the input/output unit, so that it can be an industrial control system, the logical functions of which one does not use.

According to another preferred embodiment of the invention, the first devices are adapted to perform their functions in an environment in the form of a home or a place of work, forming an especially well suited application of an apparatus according to the invention. In that case, said output devices may comprise one or more of: illumination devices, alarm, doorlock, and doorbell. Other output devices are of course also possible. As to the input devices, in the case of an environment in the form of a home or a place of work, these could e.g., be a doorbell, a sensor for an open front door of a home, a sensor for the status of a hot plate, a detector for the presence of a person at a location or in a furniture in a home, such as on a bed. With such input and output devices of an apparatus of the invention, possibilities for an active intellectual support for persons with developmental disability or dementia are offered, so that these persons, during the time they have to manage on their own, have a greater possibility to better cope with simpler every day tasks. This can increase their quality of life and hopefully lead to further development.

According to another preferred embodiment of the invention, the computer unit is provided with means for entering of information into said memory device about said environment as well as about characteristics of a person supposed to reside in the environment for the adapting of said preparation of control commands to a change in the acting of this person. This is important in order for the apparatus to all the time be able to give the best possible support to said person.

The present invention also relates to a use of an apparatus according to the invention as an intellectual support for persons with developmental disability or dementia, for which support such an apparatus is especially well suited.

The present invention also relates to a method, with the advantages of such a method clearly seen from the above discussion of the apparatus of the invention.

Further advantages and advantageous characteristics of the invention will be evident from the following description.

BRIEF DESCRIPTION OF THE DRAWINGS

In the following, an apparatus according to a preferred exemplary embodiment of the invention is described with reference to the attached drawings, in which:

FIG. 2 is a somewhat more detailed view of the plant of FIG. 1, however, with some of the parts shown in FIG. 1 being omitted.

DETAILED DESCRIPTION OF A PREFERRED EMBODIMENT OF THE INVENTION

Figure 1:
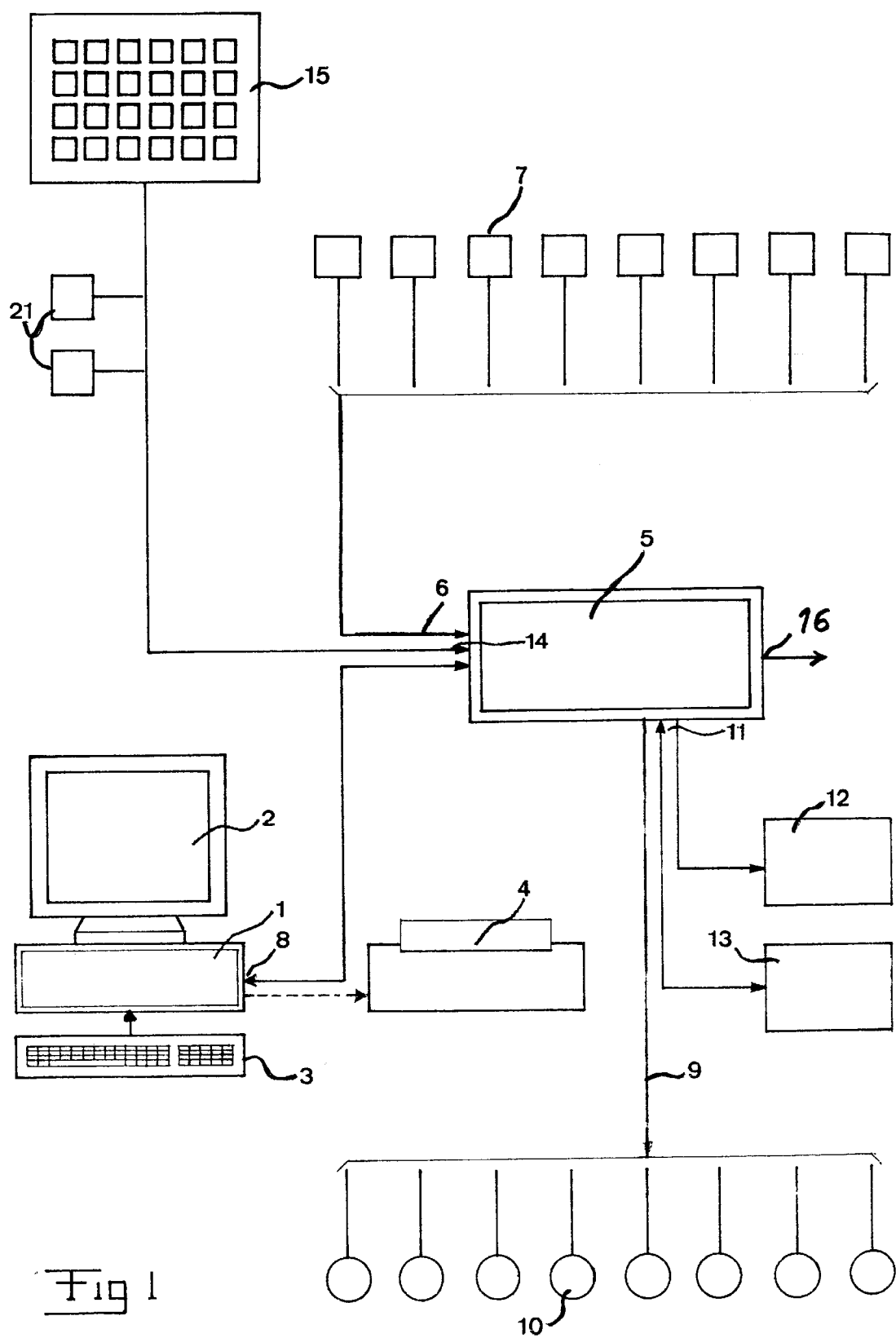
FIG. 1 is a simplified block diagram illustrating the principal design of an apparatus according to a preferred embodiment of the invention.

In FIG. 1, the general design of an apparatus according to the invention is schematically illustrated, which apparatus comprises a personal computer 1 having a screen 2, which can be used for the displaying visual messages to a person using the apparatus, as well as a keyboard 3 for input of information to the computer unit and for carrying out changes in the control program thereof. A printer 4 can also be connected to the computer unit in order to present the environment with messages in writing.

Furthermore, the apparatus comprises an input/output unit (I/O unit) 5, provided with signal input terminals, the number of which terminals i this case being eight, here collectively represented by the arrow of line 6. These signal input terminals are galvanically insulated and intended for low voltage signals. They are connected to so called input devices 7, which can be formed of, e.g., mechanical switches, a fire alarm, a doorbell selector switch, telephone signals, or the like. The input/output unit is adapted to automatically, without any information distorting processing, send every change of status in the environment reported via the input devices 7 further to the computer unit, and for this purpose the input/output unit 5 is connected to the serial port 8 of the computer unit. The signal input terminals are binary, and every terminal reports, e.g., "passive" for a signal of 0–3 volts and "active" for a signal of 9–24 volts.

The input/output unit 5 is also provided with 8 insulate relay output terminals intended for low voltage, collectively represented by the line 9. These output terminals are controlled by command from computer unit 1, which is adapted to prepare control commands which are sent through the input/output unit 5 to the output devices 10 without any information distorting processing, which device can be comprised of any electrically controllable device, such as a doorlock, illumination, a bed-lift, an alarm, a TV receiver, or the like.

The input/output unit is further provided with a serial port 11, which in the first place is intended for connection to synthetic speech equipment, a Braille display or a small printer. The port can to some extent replace the serial port of the computer unit which is occupied by the connection to the input/output unit 5.

The input/output unit has another type of binary input terminals, viz. a port 14 for up to 64 connecting/disconnecting connector functions. The port is designed as a 16 poles x/y matrix having 8 rows and 8 columns. The input/output unit reads the status of the port and reports automatically immediately every change of status to the computer unit 1. Also, as indicated by 21, individual devices similar to the devices 7 can be connected to the port 14.

In FIG. 2 is shown in more detail how the input/output unit 5 could be designed. Herein is shown how the input/output unit 5 is provided with an expansion port 16. To this a variety of additional modules can be connected in the form of a chain, with automatic identification and addressing of the modules. In that case there may be modules for remote control/communication by means of IR or radio 17. There can also be a module 18 for keyboard emulation, whereby a possible connected specially designed keyboard is indicated by 20. Further modules are indicated at 19.

Expansion port 16 is also illustrated in FIG. 1. with additional modules output modules 22, 17 and 23 connected to expansion port 16 as shown in FIG. 2.

The computer unit 1 is provided with a software facilitating construction, programming, adaptation to individuals, amendments, fault diagnosis, and documentation of computer controlled adaptations for disable persons by means of the input/output unit 5. This software includes an editor, wherein the control program of the apparatus is created. The editor is loaded into the computer in which the "programming" is to be done, and it is computer dependent, so that different varieties for different computers must be made. In the editor also program changes can be made. The result of the editing, which forms the code of the control program itself, however, will be exactly similar independent of in which computer the editing has been done, and for which computer it has been done, so that the control program itself will be totally machine independent. The software also comprises an interpreter or compiler to be loaded into the specific computer unit 1 in which the control program is to be run. It is machine dependent and must be produced in different varieties for different computers. Its main task is to interpret or compile the code of the control program and, based thereupon, create an event-driven real-time multitasking program, which can be run in the specific computer. The software also has a built in help program facilitating installation, function control, and fault analysis in the apparatus. Every apparatus must in all its functions be individually closely adapted to its user. Detail functions must be able to be easily changed according to the development and changed requirements of the user. By means of the editor, a detailed function is put together in two or three simple steps:

1. One chooses amongst plain text alternatives what event should trigger a certain measure.
2. One chooses amongst plain text alternatives the measure or measures desired to be performed when this event occurs.
3. Thereafter, when desired, one can indicate from plain text alternatives which conditions simultaneously must be fulfilled in order for the measure to factually be performed.

By doing this the detail function is ready and next detail function can be dealt with.

The editor is preferably self-instructing, i.e., any person wanting to accomplish a control program or to make any changes in an existing program should not have to be a programmer.

The computer can be located in a wardrobe or in another hidden place, if the person with developmental disability does not have any reason to work with the computer itself. However, it is also possible to use the computer for entirely conventional operations, such as games, even though the function of the plant of the invention is continuously running in parallel.

An apparatus of the above described type has the possibility to give its user an active intellectual support, which is all the time adapted to present situation and can be adapted to the development the particular person is going through. This is possible by virtue of the fact that all grounds for the decision to be taken are gathered in the computer unit 1, i.e., all input signals to the input/output unit are transmitted without any information distorting processing thereof to the computer unit 1, which is the only place where the logical decisions of the apparatus are taken. Thus, it is all the time the computer unit that solely has full control over all that is happening and makes all the decisions itself. The input/output unit this forms an addition which exclusively mediates the full and unaffected information between the computer unit and the environment in both directions. The different sensors 7 and 21, which indicate whether the user is at home, if he is asleep if the stove is on, the front door locked, the telephone is ringing, etc., are connected to the input/output unit 5, which reports every change of status further on to the computer unit 1. Information as to who is calling on the telephone or ringing on the front door etc., can also be connected to the input/output unit, so that the computer unit in every moment knows the current situation surrounding the user. Such special control devices 15, which the user needs in order to affect the apparatus, e.g., push-buttons provided with symbols, suction-and-blow connectors, joysticks etc., which can not be connected directly to the computer unit, are also connected to the input/output unit.

An apparatus of this type can handle those conditions hat the user lacks the qualifications of his own to handle/keep track of, and thereby function as an intellectual support (it can also alarm when some "abnormal condition" occurs to the person, or in his surroundings). The way this could be accomplished in practice will now briefly be described in an example. The following assumption is made: A person, in this example called Elsa, has a slight developmental disability and lives in an apartment of her own. Among other things she has a bad memory and hard to comprehend the concept of time and the meaning of a certain point of time. Elsa's apartment is equipped with a an apparatus of the invention. Elsa uses a symbol board 15 having push-buttons, which board has been provided with symbols or photographs on the buttons as control devices. Elsa is given the questions and the messages from the plant through loudspeakers 12. In order to answer she uses three push-buttons: a large green one meaning "yes"; a large red one meaning "no"; and a large white one meaning "please repeat the last message". These three buttons are located on a common panel. Such a panel is located in the kitchen and at some other locations in the apartment. When it is time for Elsa to get up in the mornings the apparatus says "good morning", tells the time and the day of the week and that it is time to wake up and that Elsa should turn off the wake up procedure with the button on the button on the bedside table. The apparatus repeats the wake up procedure a couple of times, until Elsa turns it off. If she does not, but instead stays in the bed, which the apparatus also can sense, the apparatus sends an alarm to the staff, since something probably is wrong with Elsa. On the other hand, if Elsa gets up without turning the wake up procedure off, the apparatus will automatically turn it off without alarming.

Later on when it is time to go to work for Elsa, she pushes the symbol with the bus, whereupon the apparatus tells whether it is along or short time until she should be preparing herself to go. The apparatus can also give her suggestions as to suitable outdoor clothes for the particular day, since it is informed of the weather. When it is time for Elsa to prepare herself to go to the bus, the apparatus will tell her so. This message can be dictated by the weather in such a way that it is sent earlier if it is cold outside, so that she will have the time to get dressed in the clothes suggested by the apparatus.

Shortly thereafter, or when she opens the front door, the apparatus checks that the stove and TV-set are turned off and that the windows are closed. If anything is wrong the apparatus will ask if it should be that way. If Elsa all the same goes without attend to the problem, the apparatus will alarm the staff. If Elsa is supposed to carry anything particular this particular day, the apparatus will ask her if she has remembered to bring it with her.

Regarding visits at the front door, the following could apply. At the front door there is no ordinary doorbell. By means of a device looking like an ordinary code lock outside the door, the apparatus can distinguish relatives and friends, authorized staff and unknown persons, each of the relatives, friends and staff having a code of their own. Depending on whether Elsa is inside and up, if she is asleep or if she is out, the apparatus can act in different ways. In this way, Elsa herself can decide whether she wants to open the door to the visitor, even if she would have been bed-bound, blind or deaf.

The above described examples of functions are only a few of the vast variety of possible functions of an apparatus of the invention. In reality it will only be the user and those who know him/her well, who will be able to specify which functions that the user needs and how they should be designed in detail in order to function in the best way for him/her. Accordingly, much of the activity of the apparatus is in a high degree adapted to the very personal characteristics of the user. Some functions may have to be so detailed that they will often have to be changed according to the development and altered needs of the user. New functions may also have to be added and old ones be removed. All these changes are generally simple to accomplish solely by of changes in the control program of the apparatus without any alteration of devices or installation.

The apparatus and method of the invention accordingly enable cost efficient solutions by means of electrically simple input devices, without the need of any electronics in the devices or wires, simple modification/detailed adaptation of the apparatus, both installation and functions, simple testing of the functions/fault diagnosis of any devices or wires (on the computer screen) without the need of a specialist or any tools, a simple way of utilizing applicable and well-functioning program parts which have been developed in other apparatus, a simple way of testing new ideas and developing new functions, and a simple way of (solely by means of replacing the program in the computer) amending the overall function of an apparatus. Thus, one and the same apparatus can serve different persons, even if they have greatly differing needs of support and capabilities (this is, for example, important in the case of places of work and learning places of work). Additionally, the invention enables ethical well-functioning solutions, since the apparatus does not have to be felt as unintentionally controlling, and every function can be refined and made more profound, so that the apparatus can act almost in the same way as a friend would have done.

Naturally, the invention is not in any way restricted to the above described preferred embodiment, and a variety of possible modifications thereof are obvious to the person skilled in the art, without departing from the scope of the invention; and It is to be noted that the term "personal computer" is used in broader meaning than PC, and that it comprises all computers being used by persons, and which computers in this context can be IBM and copies thereof, MAC, AMIGA, ATARI, HP etc., designed as stationary, portable, mobile, network servers etc. It can even be mainframe computers and even supercomputers.

The term "information distorting" can generally be equated with "logical", but in certain cases any simpler logical operation could be performed with the signals in the input/output unit without the information contained therein being distorted.

The apparatus could also be to a great help as a support and help for physically handicapped persons in need of any form of environmental control, and for deaf, blind, or persons with defect speech ability who are in need of a communication aid.

What is claimed is:

1. An apparatus for controlling of functions of first devices (10, 12, 13) in an environment depending upon events and/or conditions within, or associated with, the environment, comprising the combination of:

second devices (7, 15, 21) arranged to register events and/or conditions of the environment and to deliver information thereof, an input/output unit (5) arranged to receive said information from said second input devices (7, 15, 21), and control commands for said first output devices (10, 12, 13) and, without any information distorting processing in said input/output unit (5), to forward this information and control commands, respectively, and a computer unit (1), said input/output unit (5) being connected to a port (8) of the computer unit (1) and arranged to forward said information thereto, the computer unit (1) being arranged to, on the basis of this information and information stored in memory devices contained therein, prepare said control commands and send said control commands to the input/output unit (5), which is arranged to send said control commands forward to the output devices (10, 12, 13) pertaining to these control commands for controlling the function of said output devices (10, 12, 13), such that the computer unit (1) is arranged to make decisions, said memory devices being arranged to store information obtained from said second devices (7, 15, 21), on the environment and events taking place therein for use in the subsequent preparing of control commands for said first devices (10, 12, 13) on the basis of information obtained from said second devices (7, 15, 21) at this point in time, and of information stored in said memory devices, said memory devices being arranged to store information related to the characteristics and/or any desires of a person using the apparatus, said input/output unit (5) constituting a separate unit having no influence on information passing therethrough in both directions, said input/output unit (5) not processing any signals, and said apparatus structured and arranged to increase independence and life quality of persons being intellectually disabled or mentally retarded.

2. An apparatus according to claim 1, characterized in that the memory devices are adapted to store information obtained from said second input devices (7, 15, 21), on the environment and events taking place therein for use in the subsequent preparing of control commands for said first output devices (10, 12, 13) on the basis of information obtained from the second input devices (7, 15, 21) at this point in time, and information stored in said memory devices.

3. An apparatus according to claim 1, characterized in that said memory devices are adapted to store information related to the characteristics and/or any desires of a person using the apparatus.

4. An apparatus according to claim 1, characterized in that computer unit (1) is a programmable personal computer.

5. An apparatus according to claim 4, characterized in that the computer unit (1) is adapted to prepare said control commands on the basis and by means of said memory devices having access to all available information within the apparatus, upon which the form of said control commands might be dependent for adapting said control commands to the current situation in the environment.

6. An apparatus according to claim 1, characterized in that the computer unit (1), in dependence upon of the information received from the input/output unit (5) as well as the information stored in said memory devices, is adapted to prepare control commands for and send such commands to a device (12) contained in the apparatus and arranged to provide the environment with audible messages.

7. An apparatus according to claim 1, characterized in that the computer unit (1), in dependence upon of the information received from the input/output unit (5) as well as the information stored in said memory devices, is adapted to prepare control commands for and send such commands to a screen (2) contained in the apparatus and arranged to provide the environment with visual messages.

8. An apparatus according to claim 1, characterized in that the computer unit (1), in dependence upon the information received from the input/output unit (5) as well as the information stored in said memory devices, is adapted to prepare control commands for and send such commands to a printer (4) contained in the apparatus and arranged to provide the environment with messages in writing.

9. An apparatus according to claim 1, characterized in that the computer unit (1) is adapted to become activated in regards to the preparation of said commands by changes of status or other events in the environment reported thereto from said second input devices (7, 15, 21) via the input/output unit (5).

10. An apparatus according to claim 1, characterized in that the computer unit (1) comprises an editor adapted to prepare said control commands and give these a form independent of the type of computer unit, and make the control commands machine independent.

11. An apparatus according to claim 10, characterized in that the computer unit (1) comprises an interpreter or compiler adapted to rearrange the control commands prepared by the editor into control commands suitable for the controlling of said first output devices (10, 12, 13).

12. An apparatus according to claim 1, characterized in that the input/output unit (5) is adapted to communicate with the computer unit (1) through any suitable communication port thereof.

13. An apparatus according to claim 1, characterized in that the input/output unit (5) lacks means for logical signal processing.

14. An apparatus according to claim 1, characterized in that the first devices (10, 12, 13) are adapted to perform their functions in an environment in the home or place of work.

15. An apparatus according to claim 14, characterized in that said output devices comprise one or more of means for illumination, an alarm, a doorlock, and a doorbell.

16. An apparatus according to claim 14, characterized in that said input devices (7, 15, 21) are adapted to perform their registering in an environment in the home or place of work, and preferably comprise one or more of a doorbell, a sensor to open a front door of a home, a sensor for the status of a hot plate, a detector for the presence of a person at a location or in a furniture in a home.

17. An apparatus according to claim 1, characterized in that the computer unit (1) is provided with means (3) for entering information into said memory devices about said environment as well as about characteristics of a person supposed to reside in the environment for adapting said preparation of control commands to a change in the acting of the person.

18. An apparatus according to claim 1, characterized in that said input device (7) includes sensors in a machine equipment, and these sensors are adapted to give signals through the input/output unit (5) in order to provide support for a user and/or to control any operations of a machine.

19. An apparatus according to claim 12, wherein the input/output unit (5) communicates with the computer unit (1) through its serial port (8).

20. An apparatus according to claim 16, wherein the furniture is a bed.

21. Method for controlling functions of equipment in an environment depending on events and/or conditions within, or associated with, the environment, comprising the steps of registering the events and/or conditions in the environment and delivering the same to an input/output unit (5), sending the information from the separate input/output unit (5) to a computer unit (1) without any information distorting processing passing through the input/output unit (5), preparing and sending control commands from the computer unit (1) via said input/output unit (5) without any information distorting processing in said input/output unit (5), to select at least one of first output devices (10, 12, 13) of the equipment for controlling functioning of the output devices (10, 12, 13), such that said computer (1) makes decisions, storing, in memory devices contained within said computer (1), information obtained from second input devices (7, 15, 21) on the environment and events taking place therein for use in the subsequent preparing of control commands for said first output devices (10, 12, 13) on the basis of information obtained from said second input devices (7, 15, 21) at this point in time, and information stored in said memory devices, storing, in said memory devices, information related to characteristics and/or any desires of a person using said first devices (10, 12, 13), arranging said input/output unit (5) as a separate unit having no influence on information passing therethrough in both directions and not processing any signals in said input/output unit (5), and thereby increasing independence and life quality of persons who are intellectually disabled or mentally retarded.

* * * * *